April 9, 1946.  A. Y. DODGE  2,398,087
OVERSPEED RELEASE CLUTCH
Filed Aug. 9, 1944
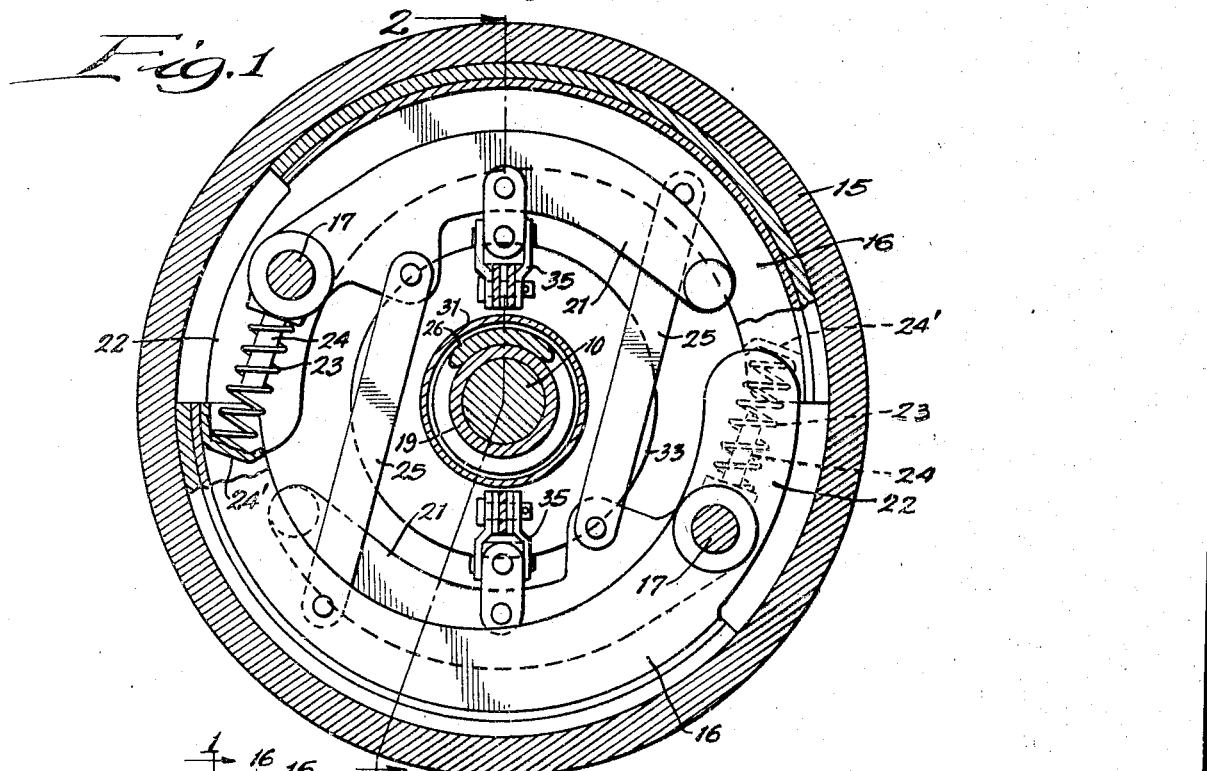
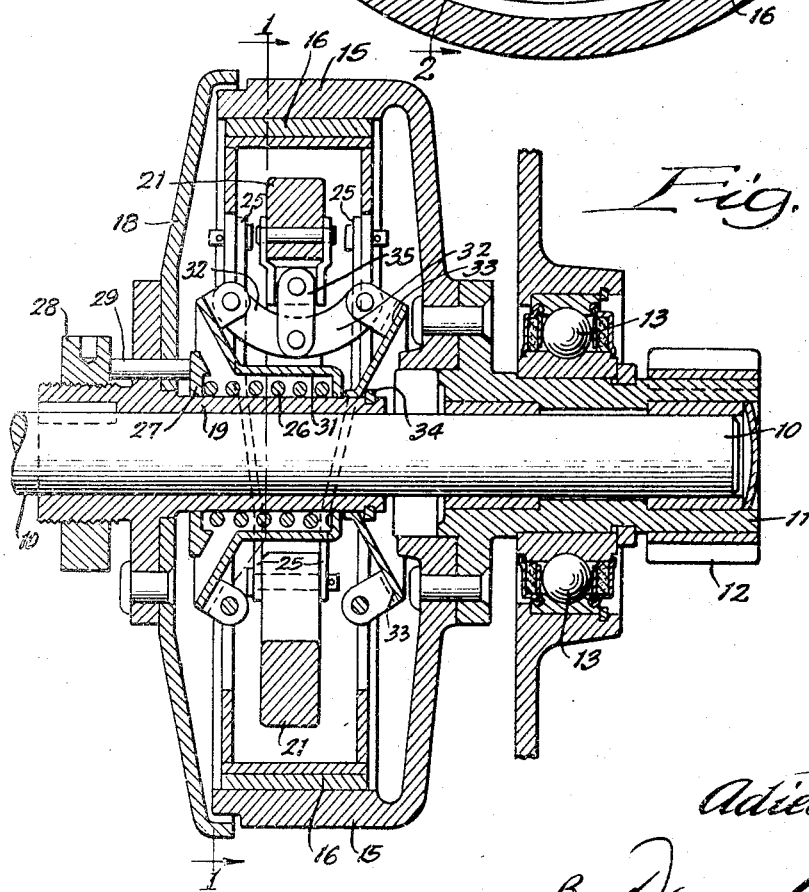
Inventor:
Adiel Y. Dodge,
By Dawson, Orrus & Booth
Attorneys Patented Apr. 9, 1946

2,398,087

UNITED STATES PATENT OFFICE 2,398,087

OVERSPEED RELEASE CLUTCH

Adiel Y. Dodge, Rockford, Ill.

Application August 9, 1944, Serial No. 548,641

8 Claims. (Cl. 192—104)

This invention relates to overspeed release clutch and more particularly to a clutch for drivably connecting two rotatable members and for disconnecting them in response to a speed above a predetermined maximum.

One of the objects of the invention is to provide an overspeed release clutch which will disengage above a predetermined speed and will not re-engage until some lower predetermined speed has been reached.

Another object is to provide an overspeed release clutch in which disengagement is produced above a predetermined speed by weights opposed by springs and in which the mechanical advantage of the weights relative to the springs is increased during disengagement.

Still another object is to provide an overspeed release clutch in which a toggle linkage connects the operating weights to an opposing spring to change the mechanical advantage between the weights and spring as the weights move.

A further object is to provide an overspeed release clutch in which friction type shoes are urged into engagement by direct acting springs and are disengaged by centrifugal weights variably opposed by springs.

The above and other objects and advantages of the invention will be more readily apparent from the following description when read in connection with the accompanying drawing, in which:

Figure 1 is a transverse section on the line 1—1 of Figure 2 of an overspeed release clutch embodying the invention; and Figure 2 is a section on the broken line 2—2 of Figure 1.

The clutch as shown, is adapted to connect a shaft 10 to a sleeve 11 illustrated as carrying a gear 12. Either the shaft 10 or the sleeve 11 may be the driving member as preferred. The shaft preferably extends thru the sleeve and is journalled therein and the sleeve may be supported by one or more bearings shown at 13.

The sleeve 11 carries a drum having an axially extending flange portion 15 adapted to be engaged by friction shoes 16. The shoes as shown are pivoted adjacent one end on diametrically spaced pivots 17 which are connected to the shaft 10. The pivots may be carried by a flange member 18 secured to a sleeve 19 which is keyed to the shaft 10 or by any other desired type of mounting means. Each of the pivots 17 also pivotally supports one end of a centrifugal weight 21. As seen in Figure 1, the weights and shoes extend in the same circumferential direction from the pivots with the weights lying between side flanges on the shoes and movable radially relative to the shoes.

The shoes preferably support and guide each other by means of extensions 22 projecting beyond the pivots 17 and overlying the sides of the opposite shoe adjacent its free end. In this manner axial movement of the free ends of the shoes is prevented and they are adequately guided and supported in the assembly. The shoes are urged into engagement with the drum by springs 23 acting between each of the pivots and the free end of the shoe which is pivoted on the opposite pivot. The springs may be guided by projections 24 and may seat on sheet metal brackets 24' welded or riveted in place adjacent the free ends of the shoes.

The weights are adapted to move the shoes out of engagement with the drum in response to centrifugal force. For this purpose each weight is connected at a point adjacent but spaced from its pivot to a point adjacent the free end of the shoe on the opposite pivot by links 25. With this construction as the weights move out in response to centrifugal force, they will pull the shoes in out of engagement with the drum.

The weights are urged in toward the axis of the shaft 10 by a coil spring 26 surrounding the sleeve 19 and abutting against a ring 27 which is slidable on the sleeve. The ring 27 may be adjusted to adjust the spring tension by a collar 28 threaded on the sleeve 19 and engaging the ring thru pins 29.

The spring engages a collar 31 which is slidable on the sleeve 19 to urge it to the right as seen in Figure 2. The collar is pivotally connected to one end of a toggle linkage including a pair of links 32 pivotally interconnected at their centers. The opposite ends of the toggle linkages are pivoted to a fixed collar 33 which is held against axial movement on the sleeve 19 by a retainer ring 34. The center pivot of each of the toggle linkages is connected to the weights thru a linkage 35.

When the shafts are stationary or rotating at a relatively low speed the shoes 16 will be urged into engagement with the drum 15 by springs 23 and by the spring 26 acting thru the toggle linkage and the weight. It will be noted in this position, that the toggle linkage tends to move the weights inwardly and that the links 32 lie at a relatively acute angle to each other.

As the speed increases to a point where the weights 21 exert sufficient force to overcome the spring 26 they will start to move outwardly and thru the links 25 will move the shoes out of engagement with the drum. At the same time, the toggle linkage will tend to straighten out so that weights will have an increased mechanical advantage over the spring 26. Therefore, once the weights start to move out they will continue to move until they have reached their extreme outer position so that the clutch will be disengaged without chattering and with a minimum degree of slipping once the speed for which it has been adjusted is reached.

When the weights have moved out to disengage the clutch shoes from the drum they will remain out until a speed lower than the disengaging speed has been reached. This is because of the fact that the mechanical advantage of the weights over the spring 26 is at a maximum when the weights are in their extreme outer position with the toggle linkage nearly straight. When the speed reaches a value below that at which the weights can remain in their outer position, they will move in quickly to permit a prompt reengagement of the shoes with the drum since in this direction of motion the mechanical advantage of the spring 26 over the weights is increasing.

While one embodiment of the invention has been shown and described in detail it will be understood that this is illustrative only and is not intended as definition of the scope of the invention, reference being had for this purpose to the appended claims.

What is claimed is:

1. An overspeed release clutch for connecting two rotatable members comprising drivably engageable clutch parts carried by the members respectively, a centrifugal weight carried by one of the members and movable in response to centrifugal force, a connection between the weight and one of the clutch parts whereby as the weight moves out in response to centrifugal force it disengages the clutch parts, a spring, and mechanism operatively connecting the spring to the weight to urge the weight inward and the clutch parts into engagement, said mechanism including a link whose angle changes relative to the spring as the weight moves to increase the mechanical advantage of the weight over the spring as the weight moves out and to decrease the mechanical advantage of the spring relative to the clutch part.

2. An overspeed release clutch for connecting two rotatable members comprising drivably engageable clutch parts carried by the members respectively, a centrifugal weight carried by one of the members and movable in response to centrifugal force, a connection between the weight and one of the clutch parts whereby as the weight moves out in response to centrifugal force it disengages the clutch parts, a collar movable relative to the clutch parts and the weight, a spring urging the collar in one direction, and mechanism connecting the collar to the weight to urge the weight inward, the mechanism including a link which changes its angle relative to the spring as the weight moves out in response to centrifugal force to increase the mechanical advantage of the weight over the spring.

3. An overspeed release clutch for connecting two rotatable members comprising a drum carried by one of the members, a friction shoe movably carried by the other member and engageable with the drum drivably to connect the members, a weight movably carried by one of the members to move radially outward in response to centrifugal force, a connection between the weight and the shoe to move the shoe out of engagement with the drum as the weight moves out, a spring, and mechanism connecting the spring to the weight to urge the weight inward, the mechanism including a link which changes its angle relative to the spring as the weight moves out to increase the mechanical advantage of the weight over the spring.

4. An overspeed release clutch for connecting two rotatable members comprising a drum carried by one of the members, a friction shoe movably carried by the other member and engageable with the drum drivably to connect the members, a weight movably carried by one of the members to move radially outward in response to centrifugal force, a connection between the weight and the shoe to move the shoe out of engagement with the drum as the weight moves out, a spring, and mechanism connecting the spring to the weight to urge the weight inward, the mechanism including a toggle linkage which is straightened as the weight moves out to increase the mechanical advantage of the weight over the spring.

5. An overspeed release clutch for connecting two rotatable members comprising a drum carried by one of the members, a friction shoe movably carried by the other member and engageable with the drum drivably to connect the members, a weight movably carried by one of the members to move radially outward in response to centrifugal force, a connection between the weight and the shoe to move the shoe out of engagement with the drum as the weight moves out, a spring, and mechanism connecting the spring to the weight to urge the weight inward, the mechanism including a collar movable axially of the members and which is urged in one direction by the spring and a toggle linkage connected at one end to the collar and at its center to the weight to increase the mechanical advantage of the weight over the spring as the spring moves out.

6. An overspeed release clutch for connecting two rotatable members comprising a drum carried by one of the members, a friction shoe pivotally mounted at one end on the other member and movable into engagement with the drum, a centrifugal weight pivoted on the other member and movable outward in response to centrifugal force, a direct connection between the shoe and the weight to move the shoe out of engagement with the drum as the weight moves out, a spring engaging the shoe to urge it into engagement with the drum, a second spring, and mechanism connecting the second spring to the weight to urge it inward, the mechanism including a toggle linkage which tends to straighten out as the weight moves out to increase the mechanical advantage of the weight over the spring.

7. An overspeed release clutch for connecting two rotatable members comprising a drum carried by one of the members, a pair of diametrically spaced pivots on the other member, a friction shoe and a centrifugal weight pivoted on each of the pivots and extending in the same circumferential direction therefrom, the shoes being engageable with the drum drivably to connect the members, links connecting the weights respectively to the shoes on the opposite pivots so that as the weights move out in response to centrifugal force they will move the shoes in out of engagement with the drum, extensions on each of the shoes extending beyond the pivots to engage and guide the free ends of the opposite shoes, springs acting between the pivots and the free ends of the shoes to urge the shoes into engagement with the drum, a spring adjacent the axis of the shaft, and mechanism connecting the last named spring to the weights to urge the weight inward and including a link whose angle changes relative to the spring to change the mechanical advantage of the weights relative to the spring as the weight moves out.

8. An overspeed release clutch for connecting two rotatable members comprising a drum carried by one of the members, a pair of diametrically spaced pivots on the other member, a friction shoe and a centrifugal weight pivoted on each of the pivots and extending in the same circumferential direction therefrom, the shoes being engageable with the drum drivably to connect the members, links conecting the weights respectively to the shoes on the opposite pivots so that as the weights move out in response to centrifugal force they will move the shoes in out of engagement with the drum, a collar movable axially of the members, a spring urging the collar in one direction, and toggle linkages connected at one end to the collar and at their centers to the weights respectively to urge the weights inward, the toggle linkages tending to straighten out as the weights move out to increase the mechanical advantage of the weights over the spring.

ADIEL Y. DODGE.